Figure 1:
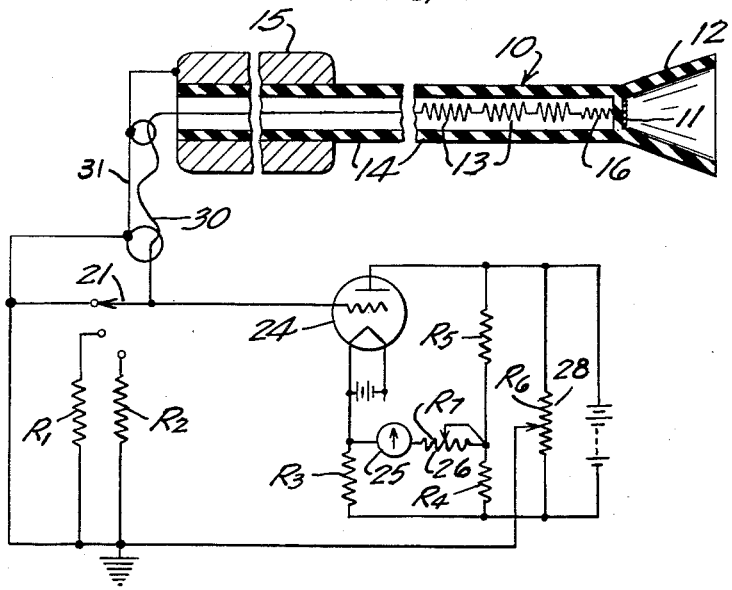

INVENTORS
HOWARD W. ECKER
REYNOLDS MARCHANT
RAYMOND J. WAGNER
BY
Gilbert B. Gehrenbeck
AGENT United States Patent Office 2,927,269
Patented Mar. 1, 1960

2,927,269
VOLTMETER

Howard W. Ecker, Reynolds Marchant, and Raymond J. Wagner, St. Paul, Minn.

Application October 26, 1955, Serial No. 542,975

7 Claims. (Cl. 324—72)

This invention relates to voltmeters, and is particularly concerned with meters for measuring high potentials on surfaces of low conductivity and low capacity.

Electrostatic potentials of considerable magnitude are frequently generated on power transmission belts, continuous moving webs of paper or plastics, and other objects of low conductivity. These high potentials have caused explosions and fires by producing spark discharges in the presence of explosive vapors and combustible materials. Spark discharges of otherwise harmless intensity have been the cause of accidents to unwarned and unsuspecting personnel. Generation of high potentials on traveling webs of paper has resulted in offsetting of ink and other coating or printing materials, necessitating frequent stops for cleaning of apparatus, and producing printed or coated products of inferior quality. These and other harmful effects may often be eliminated by proper grounding or neutralizing of the charge; but effective control and elimination of these undesirable high potentials is dependent on their detection and measurement.

In other instances, measurement of high potentials may be desired in order to maintain a particular system within required voltage limits, or to determine rapid changes in voltage, or for various other purposes.

Electrostatic voltmeters, which operate on the forces set up between adjacent charged plates or vanes, are capable of measuring high voltages; and attempts have been made to use such instruments for the type of measurements just indicated. These voltmeters require a high charging current and exhibit high energy storage. They are usually bulky and delicate, and must be leveled before use and protected from mechanical shock.

Another method for measuring high electrostatic potential involves the use of a capacity divider in combination with a low voltage, low current indicator. The probe or test electrode may serve as a portion of the divider circuit, in which event the spacing between probe and test surface must be carefully controlled. Capacity dividers cannot be used for continuous measurement of variable voltage but require discharge of the system after each determination.

The present invention avoids these and other defects and deficiencies of prior art high-voltage measuring systems. It provides means for measuring high voltages, particularly above a few hundred volts, with surprising accuracy and substantially independently of probe position. Both positive and negative voltages are measured and identified. Danger of harmful sparking between source and instrument is eliminated. Thrue voltage readings are obtained from both low conductivity and high conductivity surfaces. Measurements are sufficiently rapid to permit continuous determination of voltage on traveling webs of paper or the like. Furthermore the instrument may be made easily portable if desired, or may be permanently installed, e.g., as a recording or controlling voltmeter unit.

These and other advantages are obtained by employing a current-flow type of indicator instrument in combination with a novel probe element capable of rapidly establishing equilibrium with the test surface voltage regardless, at least within wide limits, of the geometric relationship existing between the two. The current-flow indicator is rugged and portable. The probe unit cooperates with the indicator to provide the novel results described.

Figure 2:
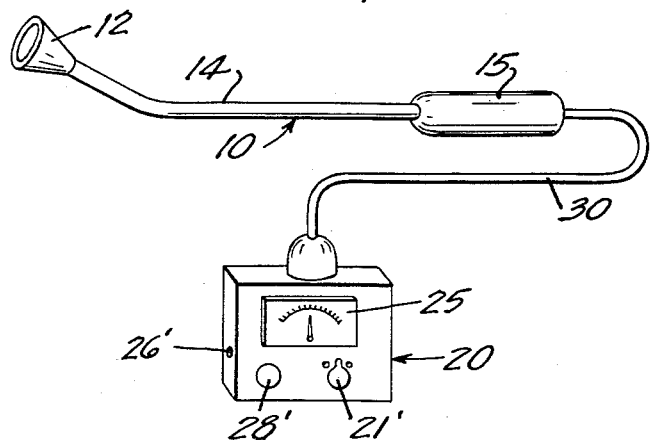

The principles of the invention will now be described in connection with the accompanying drawing, in which Figure 1 is a circuit diagram, in conventional form, and Figure 2 is a view in perspective, of a portable voltage-measuring unit embodying these principles.

The exemplary measuring unit illustrated in the drawing includes a probe unit 10 and a meter 20, the two being interconnected by means of a suitable shielded cable 30, in this case a flexible cable since the apparatus is designed for portability. The shield 31 grounds the metal hand grip 15.

The meter unit 20 includes a microammeter 25 in the output circuit of the triode 24 as illustrated. The test current from the probe unit 10 induces a potential across the grid of the triode. The range selector switch 21 provides for holding the indicated voltage within the scale of the meter 25. Zero setting of the meter is obtained through adjustment of potentiometer 28 prior to making a measurement. Calibration of the instrument is accomplished by adjusting potentiometer 26 while activating the probe with a test surface at a known voltage.

In a typical meter circuit of the type illustrated the values of the several resistor components are as follows:

| | | |
|---|---|---|
| $R_1$ | megohms | 500 |
| $R_2$ | do | 5,000 |
| $R_3$ | ohms | 75,000 |
| $R_4$ | do | 30,000 |
| $R_5$ | do | 30,000 |
| $R_6$ | do | 100,000 |
| $R_7$ | do | 100,000 |

The triode is a low grid current type electronic amplifier. The plate voltage is 30 volts.

The surprising and advantageous results obtainable with the voltmeter of this invention are due in large part to the combination of the sensitive but rugged electronic current-flow voltmeter unit with the novel directional probe unit now to be further described. As illustrated, the probe unit 10 comprises a hollow frusto-conical tip 12 terminally mounted on a protective insulating handle 14. An electrode 11 is mounted at the base of the conical tip. For use with the specific meter unit described above, the conical tip is three-fourths of an inch inside diameter at the open end, and the vertical distance from the surface of the electrode 11 to the open end of the cone is also three-fourths of an inch. The angle formed by opposing side elements of the cone is 20 degrees. The cone, and the tubular handle to which it is attached, are formed of polystyrene or other equally effective moisture-resistant insulating material.

The tubular handle 14 contains a small protective resistor 16 directly adjacent the electrode 11 and a series of high resistance current-limiting resistors 13 spaced along at least a major portion of the forward interior of the tube. These several resistors 13 have an extremely high total resistance value, being in the example here given about six million megohms.

The operation of the device is particularly dependent on the nature of the electrode 11, which, for the purposes here set forth, is required to be radioactive or capable of causing ionization of the air or other gas with which it may be in contact. In the specific embodiment here described, the electrode 11 is in the form of a flat metal disc having a face area of one-tenth square inch and plated on the exposed flat face with a total of 150 micrograms of radium.

The meter is first calibrated by reference to a test surface at a known potential, for example, a flat metal panel connected to a high-voltage battery. The open end of the conical tip of the probe is held facing the panel and at a distance of about 1–3 inches, while the potentiometer 26 is adjusted by means of screw 26′ to the approximate corresponding scale reading. The probe is then removed from the source of potential and the zero setting of the meter is re-adjusted by means of potentiometer 28, operated through the knob 28′. One or more subsequent re-checks against the known potential and re-adjustments of the zero setting may be necessary if a high degree of accuracy is desired. Once the calibration is completed, any slight drift of the zero reading during use of storage may be compensated by adjustment of potentiometer 28 without disturbing the calibration potentiometer 26.

Swith 21, operated through knob 21′, provides means for selecting the proper meter scale corresponding to the voltage range to be tested.

It is to be noted that the specific distance between probe and test surface, within the approximate limits suggested, is not in any way critical. Thus the probe may be fixed in place, facing a moving web of paper or other material, to provide continuous analysis of surface voltage regardless of minor flutter or sag in the web; a result which has not been found possible with previously available high-volatge electrostatic measuring devices, so far as we have been able to determine. The determination is rapid, and succeeding voltages at greatly differing amplitude or opposite polarity are equally effectively registered on the meter.

The nature of the probe unit, and the method of operation of the device, ordinarily provide assurance against accidental spark discharge either to ground or to the operator. As a further precaution, the resistor 16, having in the specific circuit illustrated a value of approximately 100 megohms, may be placed immediately adjacent the plate 11 to prevent any spark discharge of energy which might be stored in the connector wire between the plate and the resistors 13 or in other metal parts. Where the capacity of such components is extremely small, this resistor may ordinarily be omitted.

The several resistors 13, totaling six million megohms, are in units of a physical size and shape permitting their enclosure within the tubular insulating handle 14, which ordinarily is desirably curved, as illustrated in Figure 2, for convenience in positioning the tip 12. In a specific instance, three two-million megohm cartridge type resistors in series, each about 4 inches long, having a total installed length of approximately 12 inches, and extending to a distance of about 15 inches from the plate 11, were employed. A single extended-length resistor of proper shape is equally effective but ordinarily is not as readily available. In either case, the resistance is extended uniformly from the tip 12 over at least a considerable portion of the length of the tubular handle, and no shield or ground element is in proximity.

The surprising speed and accuracy of operation obtained with the components described is believed to be due to the establishing of a potential gradient, along the series of resistors 13, which is roughly commensurate with the potential gradient established along the correspondingly located outer surface of the insulating handle 14 by the presence of the electrostatic charge which is to be measured. In any event the arrangement has been found to provide a probe system which rapidly reaches equilibrium in an electrical field with a minimum flow of current and without significant alteration of the ambient field. Accordingly, the measurement of true voltages on paper, plastic films, and other dielectric or insulative and low-capacity surfaces is made possible.

The total resistance of the resistors 13, while necessarily high, is not critical. At values substantially less than six million megohms the accuracy of the meter at extremely high voltages may be significantly reduced; but lower voltages may be accurately measured. Substantially increased resistance in the probe unit may require a more sensitive meter system, although values up to 12–14 million megohms have been found useful with the system described.

In order that the effectiveness of the instrument herein described as an illustrative but non-limiting example may be better appreciated, it is pointed out that under optimum conditions a current of only about 0.008 microampere per 50 killovolts is required. Operation is possible with currents as high as 0.1 microampere per 50 kilovolts but the accuracy of measurement is substantially reduced when measurement of potential existing on dielectric or insulative surfaces is made with current drains of this magnitude.

While the invention has been described primarily in terms of a preferred portable unit and with components of specified constants, it will be apparent that modifications can be readily provided within the skill of the art. Thus the voltage and current supply to the electronic amplifier may be obtained from an alternating-current source by means of suitable well-known transformer, rectifier and filter means; the results obtained may be directly recorded by a recording type voltmeter, or may be transmitted to a suitable alarm system; and other non-inventive modifications will be apparent. In like manner, polonium or other emitter of alpha particles or of low energy beta particles may replace the radium on the collector electrode 11, and the area and shape of that electrode, as well as the specific form and dimensions of the tip 12, may also be altered. However the specific structure hereinbefore described has been found in practice to be highly suitable, being well adapted to the rapid determination of high voltages without harmful discharge and at variable distances.

Having now described our invention in terms of specific illustrative embodiments, but without intending to be limited thereto, what we claim is as follows:

1. A voltage measuring device suitable for rapidly and continuously measuring variable high static voltages without significant alteration of ambient electrostatic field and without danger of harmful spark discharge, said device comprising a directional, externally insulated, conductive, radioactive probe, a low current input electronic voltmeter, and a high resistance connecting said probe and said voltmeter and uniformly distributed within the insulating handle of said probe.

2. A voltage measuring device as defined in claim 1 in which the radioactive probe is located within a low-angle, forwardly open, hollow conical insulative shield for controlling the direction and cross-sectional area of the ionized path between probe and test surface.

3. A voltage measuring device as defined in claim 1 and capable of continuously measuring variable high static voltages on surfaces from which current flow is restricted to not greater than about 0.1 microampere per 50 kilovolts, in which the radioactive probe contains a source of radioactivity equivalent to about 150 micrograms of radium and the high resistance connection has a resistance of about six million megohms.

4. For use in a high voltage measuring device, a directional radioactive probe member comprising an insulating shield having a low-angle frustum-shaped open interior, open at the larger end and containing at the smaller interior end a radioactive collecting electrode, and conductive connector means attached to said electrode for making electrical contact therewith.

5. For use in a high voltage, low current measuring device having a conductive radioactive probe connected to a current-flow type indicator, connector means comprising a high resistance element uniformly distributed along the forward interior of a tubular insulating handle for said probe, and a relatively low resistance protective element at the forward end of said handle and connecting said probe and said high resistance element.

6. A directional radioactive probe member consisting essentially of a plastic open cup-shaped insulating shield member having a flat base and outwardly flaring truncated conical walls, a flat metallic collecting electrode member over the inner surface of said base member and having a radioactive exposed surface, and a conductive connector element attached to said electrode and passing through said base.

7. A probe and handle unit for a high-voltage voltmeter assembly, comprising an elongate tubular insulating handle member terminating in an open cup-shaped insulating shield member having a flat base and outwardly flaring truncated conical walls, a flat metallic collecting electrode member over the inner surface of said base member and having a radioactive exposed surface, an elongate resistor element disposed uniformly along the interior of at least the forward portion of said handle member, a conductive connector element passing through said base and connecting said electrode and the forward end of said resistor, and means for conductively connecting the rearward end of said resistor with potential-estimating means.

References Cited in the file of this patent

UNITED STATES PATENTS

| | | |
|---|---|---|
| 1,919,215 | Gunn | July 25, 1933 |
| 2,084,968 | Chapman | June 22, 1937 |
| 2,087,915 | Kimball | July 27, 1937 |
| 2,457,575 | Liebscher | Dec. 28, 1948 |
| 2,466,211 | Crockett | Apr. 5, 1949 |